US006921140B2

(12) United States Patent
Simons et al.

(10) Patent No.: US 6,921,140 B2
(45) Date of Patent: Jul. 26, 2005

(54) CUTTER BAR PIVOT ATTACHMENT

(75) Inventors: Shawn Robert Simons, Waterloo, IA (US); Peter Alan Kosmicki, Cedar Falls, IA (US); Lonny Dean Tisue, Sumner, IA (US); Scott Lisle Cook, Cedar Falls, IA (US); Bradley Thomas Cote, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/650,523

(22) Filed: Aug. 28, 2003

(65) Prior Publication Data

US 2005/0046277 A1 Mar. 3, 2005

(51) Int. Cl.[7] ............................................. B62D 55/088
(52) U.S. Cl. .................... 305/107; 305/110; 404/129
(58) Field of Search ................... 305/100, 107, 305/108, 109, 110; 404/129; 172/558, 561, 566

(56) References Cited

U.S. PATENT DOCUMENTS

| 1,840,070 | A | * | 1/1932 | Webber ...................... 280/855 |
| 1,942,655 | A | * | 1/1934 | McCormick et al. ....... 280/855 |
| 3,437,155 | A | * | 4/1969 | Honrud ....................... 172/566 |
| 3,861,762 | A | | 1/1975 | Freedy et al. ................. 305/12 |
| 3,976,337 | A | * | 8/1976 | Vaughn ....................... 305/107 |
| 4,490,070 | A | * | 12/1984 | Upchurch et al. ........... 404/121 |
| 4,818,040 | A | | 4/1989 | Mezzancella et al. ......... 305/12 |
| 4,830,439 | A | | 5/1989 | Collins et al. ................ 305/11 |
| 4,858,699 | A | * | 8/1989 | Poltrock ...................... 172/558 |
| 5,330,260 | A | | 7/1994 | Freeman ....................... 305/12 |
| 5,360,288 | A | * | 11/1994 | O'Neill et al. .............. 404/129 |
| 5,370,451 | A | | 12/1994 | Brownlee et al. ............. 305/12 |
| 5,697,683 | A | | 12/1997 | Arulandu et al. ........... 305/110 |
| 5,713,644 | A | * | 2/1998 | Freeman .................... 305/110 |
| 5,725,292 | A | | 3/1998 | Keedy et al. ............... 305/110 |
| 5,820,230 | A | | 10/1998 | Freeman .................... 305/107 |
| 5,863,104 | A | * | 1/1999 | Satzler ....................... 305/110 |
| 5,938,301 | A | * | 8/1999 | Hostetler et al. ........... 305/199 |
| 5,967,630 | A | * | 10/1999 | Sewell ........................ 305/110 |
| 5,988,940 | A | * | 11/1999 | Johansson ................... 404/129 |
| 6,045,201 | A | | 4/2000 | Chappell et al. ............ 305/110 |
| 6,089,684 | A | | 7/2000 | Bergstrom et al. .......... 305/110 |
| 6,196,645 | B1 | | 3/2001 | Bergstrom et al. .......... 305/110 |
| 6,527,347 | B2 | | 3/2003 | Brawley et al. ............. 301/110 |

* cited by examiner

Primary Examiner—Russell D. Stormer

(57) ABSTRACT

A cutter bar is provided for trimming debris away from the wheel-track interface of a tracked vehicle. A pivot attachment is provided wherein a knife having a cutting edge is removably mounted to a bracket by way of fasteners which will shear when a pre-selected force is applied to them. The bracket is mounted to the vehicle structure so that the knife is disposed in close proximity to the drive wheel and endless track of the vehicle. Accordingly, when a piece of tough debris is encountered by the knife edge some of the fasteners will shear and the knife pivots out of the way so that the debris can pass by without causing damage to the wheel or track. The knife and fasteners being readily serviceable with inexpensive parts.

7 Claims, 5 Drawing Sheets

CUTTER BAR PIVOT ATTACHMENT

FIELD OF THE INVENTION

The present invention relates generally to track-laying vehicles such as tracked agricultural tractors. More particularly, the present invention relates to a device for removing debris from the drive wheels of such track-laying vehicles. Specifically, the present invention relates to a means for attaching such a device wherein the device will yield upon the application of a pre-selected force to the device.

BACKGROUND OF THE INVENTION

In recent years track-laying agricultural tractors have gained in popularity as an alternative to conventional wheeled tractors, primarily due to their ability to move over a field with much less soil compaction than wheeled tractors. One problem associated with track-laying agricultural tractors is that of debris fouling the track drive of the vehicle. During turns in fields having heavy crop residue, such as fall corn stalk stubble, crop residue becomes trapped between the track drive surface and the track drive wheel. This trapped material is frequently carried upward by the drive wheel and track and dropped at the top of the drive wheel. This material then falls upon the track frame. The buildup of material requires the operator to stop periodically and clean off the top of the track frame. This process is inconvenient and time consuming and results in lost productivity. Over the years a number of different devices have been designed to cut off the exposed crop debris so as to reduce the amount of material that is dropped on the top of the track frame. One drawback to known cutter bars is that when unexpectedly tough material such as a steel fence post or the like is carried in by the track and ultimately contacts the cutter bar, the cutter bar is damaged and can be pushed into the track itself resulting in costly damage to the track and/or wheel of the vehicle.

Accordingly, there is a clear need in the art for a device for removing debris from the drive wheels of track-laying vehicles having attachment means wherein the device will yield upon the application of a pre-selected force to the device.

SUMMARY OF THE INVENTION

In view of the foregoing, it is an object of the invention to provide a device for removing excess material from the track drive of a track-laying vehicle.

Another object of the invention is the provision of such a device that will yield with the application of a pre-selected force.

A further object of the invention is to provide such a device that is readily serviced using simple tools.

An additional object of the invention is the provision of such a device that is inexpensive to produce, install and maintain.

The foregoing and other objects of the invention together with the advantages thereof over the known art which will become apparent from the detailed specification which follows are attained by a cutter bar for cutting debris away from the track of a track-laying vehicle comprising: a bracket having a mounting flange and a knife flange, the mounting flange and the knife flange each having a plurality of fastener apertures; a knife having a cutting edge and a plurality of fastener apertures corresponding to the fastener apertures of the knife flange of the bracket, the knife being removably fastened to the knife flange of the bracket by a plurality of fasteners that will shear when a pre-selected force is applied to them and the bracket being removably fastened to a vehicle structure such that the cutting edge of the knife is disposed proximal to both a drive wheel of the vehicle and an endless track of the vehicle for cutting debris entrained between the drive wheel and the endless track wherein if tough debris contacts the knife the pre-selected force will be overcome and some of the fasteners will shear permitting the knife to pivot out of the way of the debris.

In general, a cutter bar is provided for trimming debris away from the wheel-track interface of a tracked vehicle. A pivot attachment is provided wherein a knife having a cutting edge is removably mounted to a bracket by way of fasteners which will shear when a pre-selected force is applied to them. The bracket is mounted to the vehicle structure so that the knife is disposed in close proximity to the drive wheel and endless track of the vehicle. Accordingly, when a piece of tough debris is encountered by the knife edge some of the fasteners will shear and the knife pivots out of the way so that the debris can pass by without causing damage to the wheel or track. The knife and fasteners being readily serviceable with inexpensive parts.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
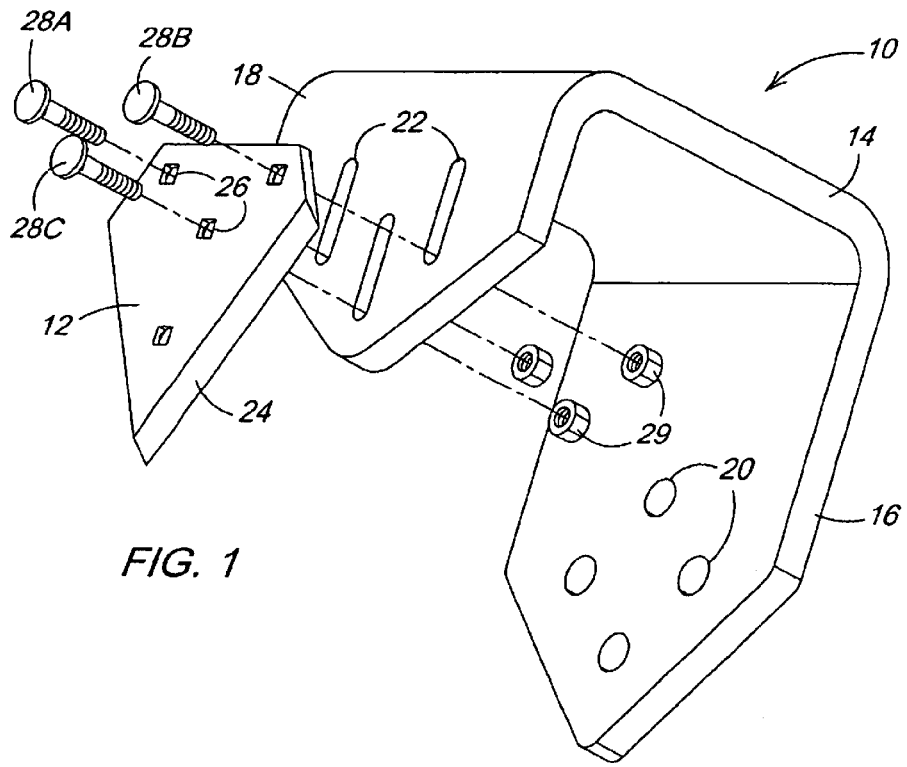
FIG. 1 is an exploded perspective view of the cutter bar according to the invention.
Figure 2:
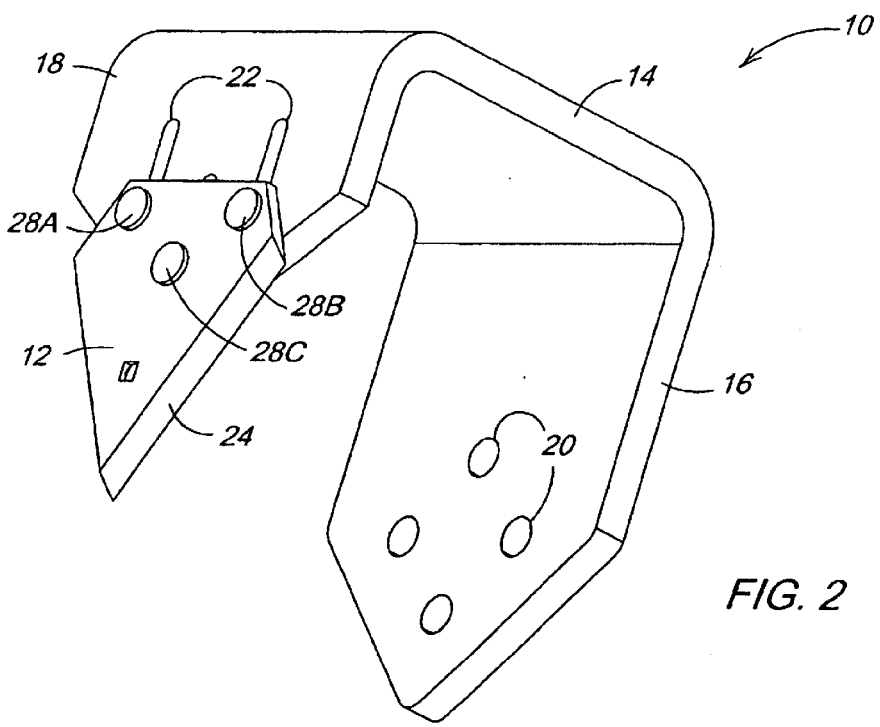
FIG. 2 is an assembled perspective view of the cutter bar according to the invention.

For better understanding of the device of the present invention an axis key is provided in some of the drawing figures to provide a degree of orientation. The x axis provides reference as to the front and rear of the vehicle with +x indicating the forward direction. The y axis provides reference as to the left and right of the vehicle with +y indicating right from the perspective of a vehicle operator facing forward. The z axis provides vertical orientation with +z indicating up. Referring now to the drawings, it can be seen that a track debris cutter bar according to the invention is designated generally by the numeral 10. As shown in FIGS. 1 and 2, the cutter bar 10 is comprised generally of a knife 12 and a bracket 14. Bracket 14 includes a mounting flange 16 and a knife flange 18. The mounting flange 16 has a plurality of fastener apertures 20, while the knife flange 18 includes a plurality of slotted apertures 22. Knife 12 is of a known design such as commonly found on row crop harvesting platforms and is accordingly readily available in large quantities as a replacement part for such applications. As shown knife 12 is of a generally triangular shape. Knife 12 includes a cutting edge 24 and a plurality of fastener apertures 26. It will be noted that the fastener apertures 26 of knife 12 correspond to the slotted apertures 22 of the knife flange 18 of bracket 14 so that, for reasons which will become apparent as the description continues, knife 12 can be adjustably mounted to the knife flange 18 by way of bolts 28 and appropriate nuts 29. The slotted apertures 22 allow the knife 12 to be adjusted relative to the knife flange 18.

Figure 3:
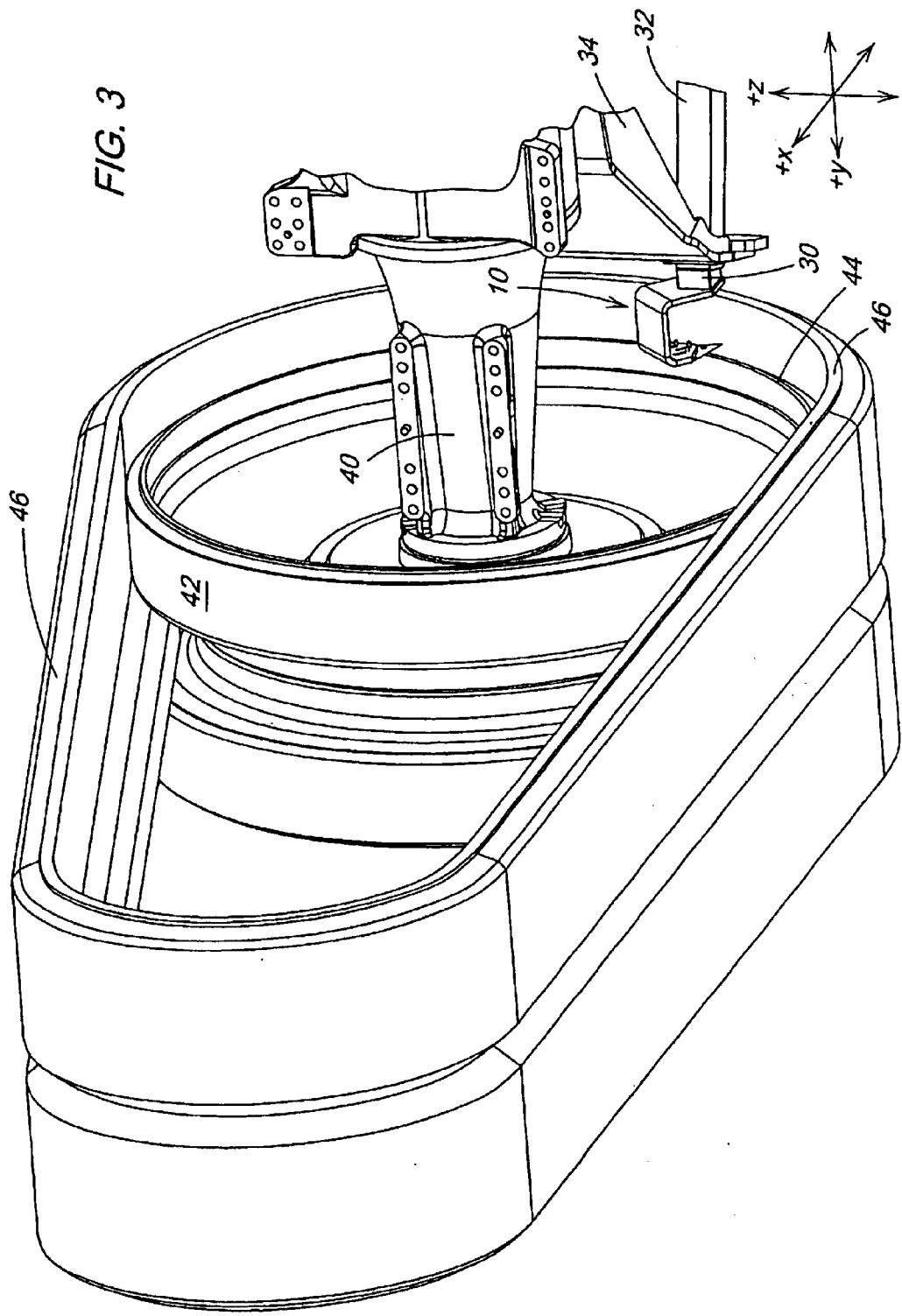
FIG. 3 is a perspective view of a wheel and track assembly of a track-laying vehicle showing the cutter bar according to the invention in place.
Figure 7:
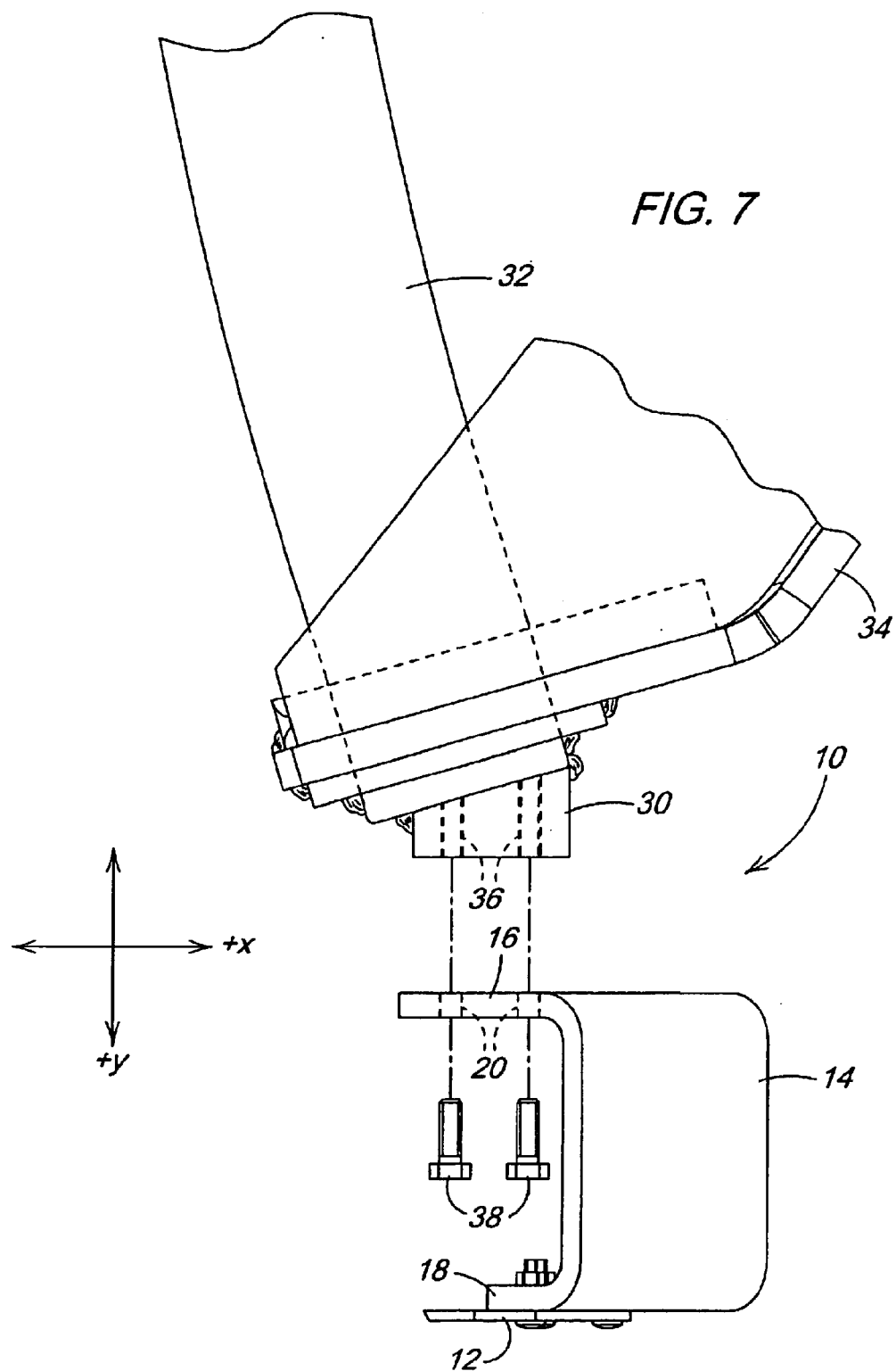

With reference now to FIGS. 3 and 7 it will be seen that cutter bar 10 is mounted to the drawbar support structure of a tracked vehicle. More particularly, the bracket 14 is bolted to a pillow block 30 that has been welded to the end of a drawbar support arc 32 that extends through the drawbar support mounting plates 34. As can be seen the pillow block 30 includes a plurality of threaded apertures 36 that correspond to the fastener apertures 20 of the mounting flange 16 of bracket 14. Accordingly, bracket 14 is removably mounted to the pillow block 30 by way of bolts 38 threaded into the apertures 36 of pillow block 30. As can be seen in the drawings the drawbar support structure to which the cutter bar 10 is mounted is located proximal to the rear drive axle 40 of the vehicle. Further, the pillow block 30 is angled correspondingly to the drawbar support structure such that when the bracket 14 is mounted thereto the knife flange 18 is maintained parallel to the vehicle center line. Thus the bracket 14 is sized and configured to place the knife 12 in close proximity to the rear drive wheel 42 when mounted to the drawbar support structure. More particularly, the knife edge 24 is disposed at the drive wheel steel rim 44 in order to cut field debris caught between the drive wheel 42 and the endless track 46. Specifically, the knife 12 is adjusted relative to the bracket 14 by way of the slotted apertures 22 so that the knife point is preferably in the range of 3–10 mm from the inside surface of the rubber track 46. It should also be noted that the knife 12 may be adjusted along the y-axis by using appropriate shims or the like. The maximum distance from the cutting edge of the knife 14 (or specifically 24) to the steel rim 44 is preferably 12.7 mm along the y-axis. These adjustments must be made for each vehicle on which the device is used so as to compensate for variations in manufacturing and parts stack-up tolerances. Those having skill in the art will recognize that if the knife 12 is too close to the rim 44 or endless track 46 friction will cause problems due to heat, wear, etc., and if the knife 12 is too far from the rim 44 or endless track 46 the device 10 will not function properly to trim debris from the rim-track interface as material will merely fold past the knife 12.

Figure 4:
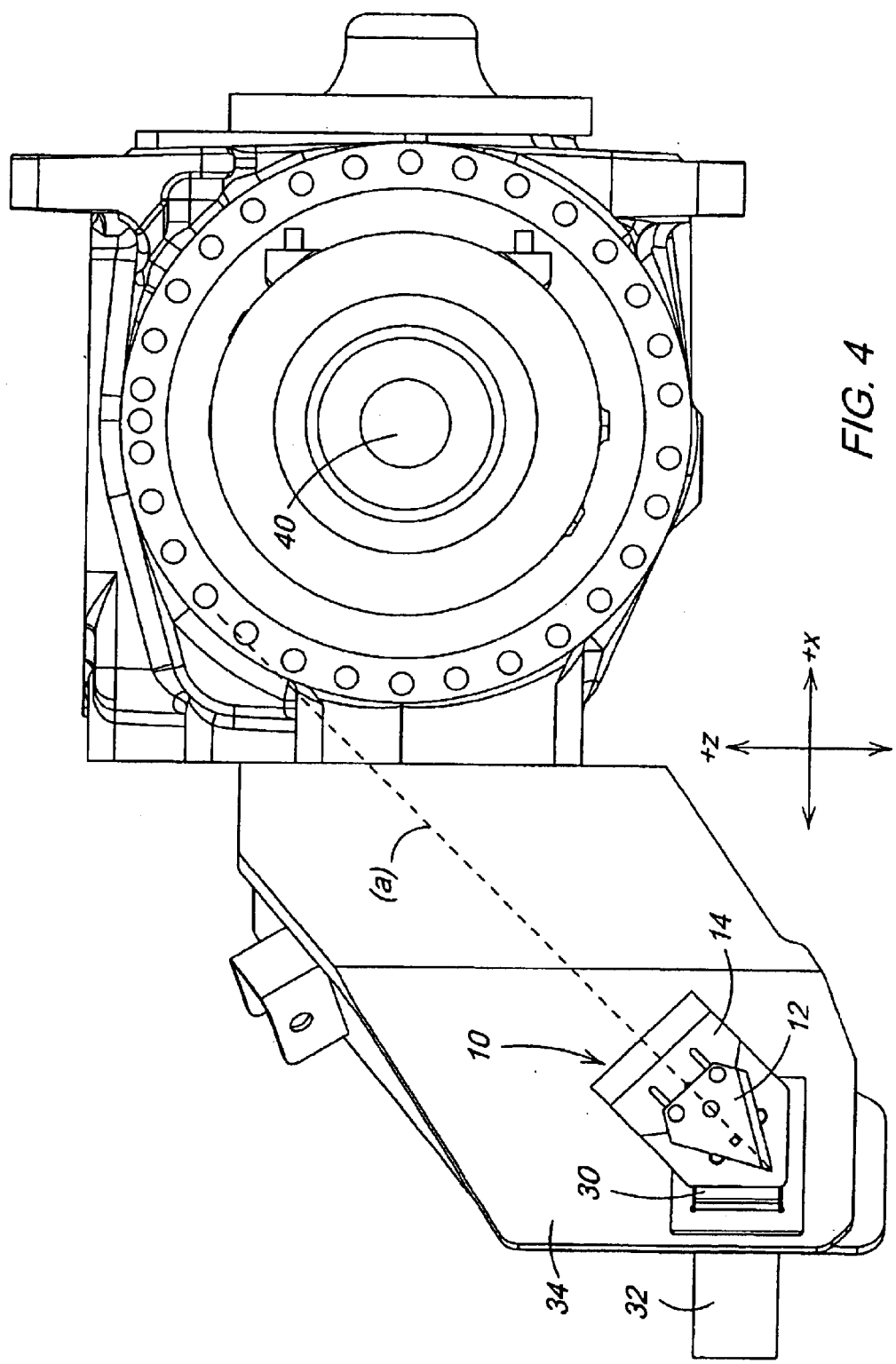
FIG. 4 is an elevational view of the rear axle and drawbar support structure showing the cutter bar according to the invention in place.

A center line (a) drawn through the tip of the knife 12 and the bracket 14 is oriented downwardly and rearwardly at a 45 degree angle. As shown in FIG. 4 line (a) passes in close proximity to the center axis of the vehicle rear drive wheel. This angular orientation of the bracket 14 relative to the wheel center axis is important to the functionality of the device, as will become apparent as the description continues. The cutter bar 10 is designed to be symmetrical about the tractor center line and can thus be used on either the right or left hand side of the vehicle.

Figure 5:
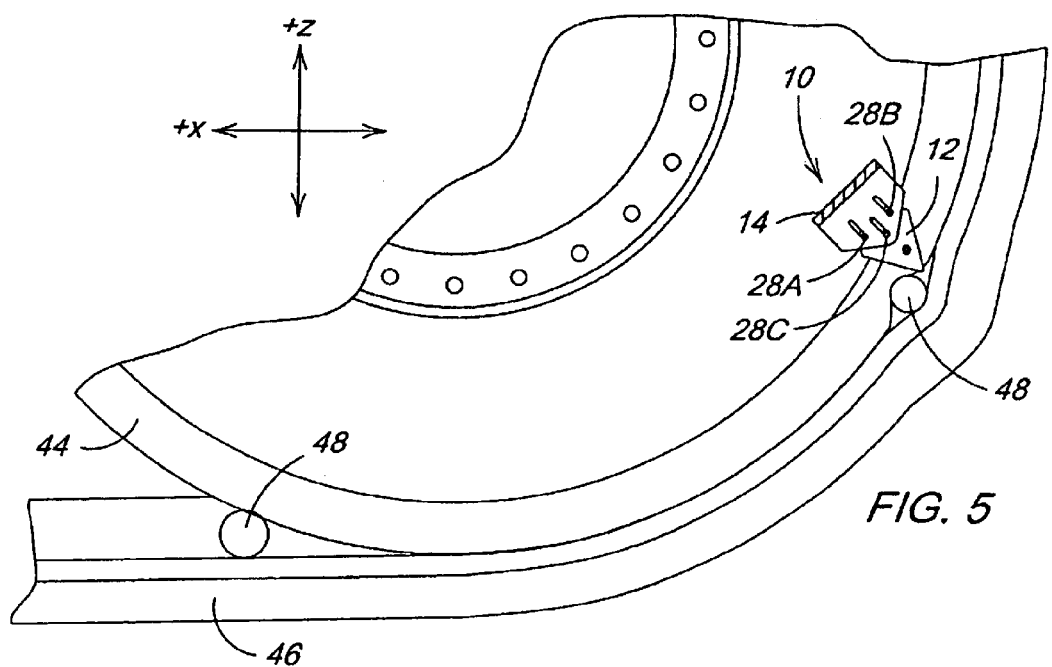
FIG. 5 is an elevational view of the wheel and track assembly of a vehicle with debris being carried toward the cutter bar.
Figure 6:
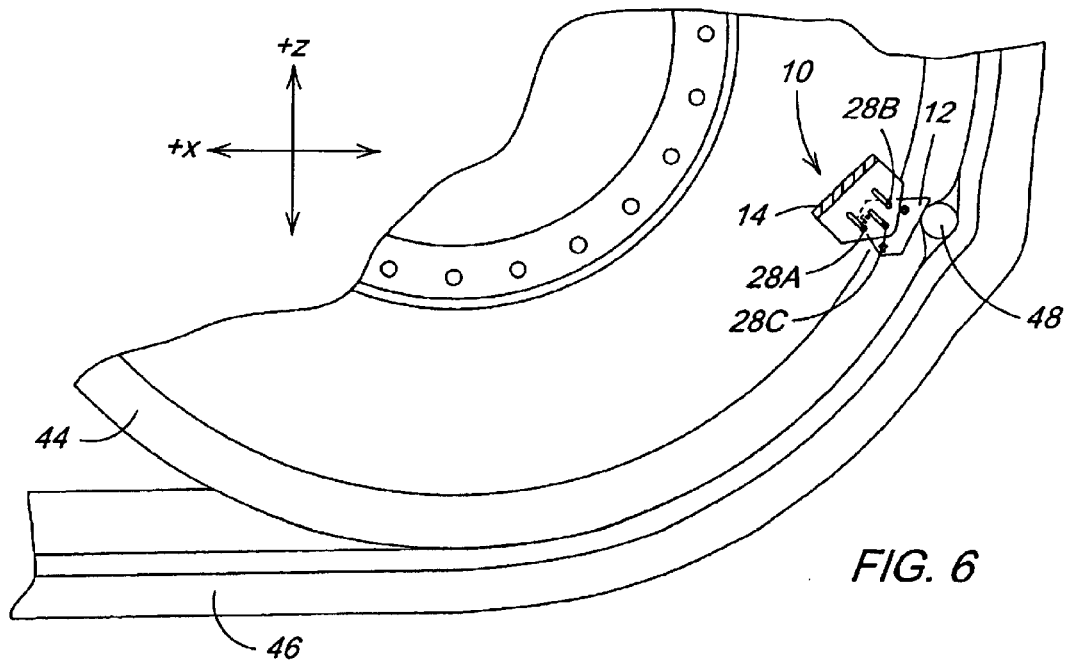
FIG. 6 is an elevational view of the wheel and track assembly of a vehicle demonstrating the behavior of the cutter bar according to the invention when tough debris is encountered; and, FIG. 7 is a partially exploded top plan view of the drawbar support structure and cutter bar according to the invention.

A novel aspect of the cutter bar of the present invention is the ability of the knife 12 to pivot, i.e., yield when an unexpectedly tough piece of material such as steel 48 or the like is carried into contact with the knife 12 by the track as shown in FIGS. 5 and 6. While the knife 12 is rigidly secured to the bracket 14 by the three bolts 28, the bolts 28 will shear when a pre-selected force is applied to them. Accordingly, when a pre-selected force is applied to the knife 12 and in turn transferred to bolts 28A and 28B due to the angle of the bracket, these bolts will shear but bolt 28C typically will not. As such the knife 12 will simply pivot around bolt 28C allowing the tough debris to pass by without damaging the wheel 42 or track 46. The 45 degree angled center line (a) of the bracket 14 and knife 12 passing in close proximity to the rear wheel center axis ensures that the force applied to the knife 12 due to tough debris is transferred to the bolts 28A and 28B and that the knife will pivot around the bolt 28C when 28A and 28B shear. Without this angular relationship debris can force the knife 12 and or bracket 14 to twist and interfere with the endless track and/or wheel rim thereby causing damage. In the case of a failure of the cutter bar due to tough debris, the user would simply need to replace the bolts 28 and the knife 12 if necessary. These parts are inexpensive and the cutter bar 10 can be serviced in this way even in the field.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A cutter bar for cutting debris away from the track of a track-laying vehicle comprising:
   a bracket having a mounting flange and a knife flange, the mounting flange and the knife flange each having a plurality of fastener apertures;
   a knife having a cutting edge and a plurality of fastener apertures corresponding to the fastener apertures of the knife flange of the bracket, the knife being removably fastened to the knife flange of the bracket by a plurality of fasteners that will shear when a pre-selected force is applied to them and the bracket being removably fastened to a vehicle structure such that the cutting edge of the knife is disposed proximal to both a drive wheel of the vehicle and an endless track of the vehicle for cutting debris entrained between the drive wheel and the endless track and a center line of the bracket and knife is disposed at a 45 degree angle to the ground, the center line passing in close proximity to a center axis of the drive wheel of the vehicle, wherein if tough debris contacts the knife the pre-selected force will be overcome and the fasteners will shear permitting the knife yield to the debris.

2. A cutter bar as described in claim 1, wherein the fastener apertures of the knife flange are elongated so that the position of the knife can be adjusted relative to the bracket.

3. A cutter bar as described in claim 1 wherein the bracket is mounted to a drawbar support structure of a tracked vehicle.

4. A cutter bar as described in claim 1 wherein the cutter bar is symmetrical about a center line of the vehicle and can thus be used on either side of the vehicle.

5. A cutter bar as described in claim 1 wherein the knife and bracket are removably mounted to the vehicle structure by way of a pillow block which has been affixed to the vehicle structure, the pillow block having a plurality of threaded apertures corresponding to the fastener apertures of the mounting flange of the bracket.

6. A cutter bar as described in claim 3 wherein the knife and bracket are removably mounted to the drawbar support structure by way of a pillow block which has been affixed to the drawbar support structure, the pillow block having a plurality of threaded apertures corresponding to the fastener apertures of the mounting flange of the bracket.

7. A cutter bar as described in claim 1 wherein the cutting edge of the knife is adjustably spaced 3–10 mm from an inside surface of the endless track.

\* \* \* \* \*